(12) United States Patent
Rioux et al.

(10) Patent No.: US 10,352,528 B2
(45) Date of Patent: Jul. 16, 2019

(54) LIGHT EMITTING DIODE TUBE LAMP INCLUDING A GLASS TUBE BODY COMPOSED OF A SELF DIFFUSIVE GLASS COMPOSITION

(71) Applicants: Philip Rioux, Brentwood, NH (US); Shiyong Zhang, Boxborough, MA (US)

(72) Inventors: Philip Rioux, Brentwood, NH (US); Shiyong Zhang, Boxborough, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 15/720,042

(22) Filed: Sep. 29, 2017

(65) Prior Publication Data

US 2019/0101260 A1    Apr. 4, 2019

(51) Int. Cl.
| | | |
|---|---|---|
| *F21V 3/06* | (2018.01) | |
| *F21V 19/00* | (2006.01) | |
| *F21V 3/02* | (2006.01) | |
| *C03C 3/078* | (2006.01) | |
| *C03C 3/089* | (2006.01) | |
| *C03C 4/00* | (2006.01) | |
| *C03C 10/00* | (2006.01) | |
| *C03B 1/00* | (2006.01) | |
| *C03C 14/00* | (2006.01) | |
| *F21K 9/278* | (2016.01) | |
| *F21K 9/272* | (2016.01) | |
| *F21V 23/00* | (2015.01) | |

(Continued)

(52) U.S. Cl.
CPC .............. *F21V 3/0615* (2018.02); *C03B 1/00* (2013.01); *C03C 3/078* (2013.01); *C03C 3/089* (2013.01); *C03C 4/00* (2013.01); *C03C 10/0009* (2013.01); *C03C 10/0054* (2013.01); *C03C 14/006* (2013.01); *F21V 3/02* (2013.01); *F21V 19/0015* (2013.01); *C03C 2204/04* (2013.01); *C03C 2214/04* (2013.01); *C03C 2214/16* (2013.01); *F21K 9/272* (2016.08); *F21K 9/278* (2016.08); *F21V 23/003* (2013.01); *F21V 23/005* (2013.01); *F21Y 2103/10* (2016.08); *F21Y 2115/10* (2016.08)

(58) Field of Classification Search
CPC .................................................... F21V 3/0615
USPC .................................................... 362/217.02
See application file for complete search history.

(56) References Cited

U.S. PATENT DOCUMENTS

| | | | | |
|---|---|---|---|---|
| 3,581,139 | A * | 5/1971 | Haft ........................ | C09K 11/02 313/486 |
| 5,770,416 | A * | 6/1998 | Lihme .................... | B01J 13/025 435/176 |
| 2016/0376170 | A1* | 12/2016 | Ivan ................. | B29D 11/00721 422/186.3 |

* cited by examiner

*Primary Examiner* — Christopher M Raabe
(74) *Attorney, Agent, or Firm* — Tutunjian & Bitetto PC

(57) ABSTRACT

A lamp is provided that includes a glass tube body composed of a glass composition that includes an optical diffusive agent to increase the light diffusivity of the glass tube body. The lamp can include a glass tube body having a perimeter defined by a sidewall of the glass tube body for enclosing a hollow interior. The glass tube body is composed of a sodium silicate glass including an optically diffusive agent that is alloyed with a silicate base glass composition. The optically diffusive agent can be selected from lithium borosilicate, titanium dioxide, antimony trioxide or combinations thereof. The lamp can further include at least one light emitting diode (LED) on a substrate that provides the light source. The at least one light emitting diode (LED) that is present on the substrate is positioned within the hollow interior of the glass tube body.

16 Claims, 9 Drawing Sheets

(51) Int. Cl.
*F21Y 115/10* (2016.01)
*F21Y 103/10* (2016.01)

LIGHT EMITTING DIODE TUBE LAMP INCLUDING A GLASS TUBE BODY COMPOSED OF A SELF DIFFUSIVE GLASS COMPOSITION

TECHNICAL FIELD

The present disclosure generally relates to lighting, and more particularly to lamp tubes used with light sources including light emitting diodes (LEDs).

BACKGROUND

Fluorescent light fixtures have been a popular form of lighting for many decades. A fluorescent lighting fixture includes one or more fluorescent tubes, with each tube having an end cap on each end of a tube. Lighting systems based on LED light sources are a fairly new technology in the lighting field. LED's are desirable because they have a longer life, and they use less power than fluorescent tubes of equivalent output.

SUMMARY

In one aspect, a lamp tube is provided for lamps, such as lamps including light sources including light emitting diodes (LEDs), in which the glass composition for the glass tube body includes an optical diffusive agent to increase the light diffusivity of the glass lamp tube. In one embodiment, the lamp tube includes a glass tube body having a perimeter defined by a sidewall of the glass tube body for enclosing a hollow interior. The glass tube body is comprised of a silicate base glass composition including an optically diffusive agent that is alloyed with the silicate base glass composition. The optically diffusive agent can be selected from the group consisting of lithium borosilicate, titanium dioxide, antimony trioxide and a combination thereof.

In another aspect, a lamp is provided that includes a glass tube body composed of a glass composition that includes an optical diffusive agent to increase the light diffusivity of the glass tube body. In one embodiment, the lamp includes a glass tube body having a perimeter defined by a sidewall of the glass tube body for enclosing a hollow interior. The glass tube body is comprised of a glass composition including an optically diffusive agent. In some embodiments, the optically diffusive agent can be selected from the group consisting of lithium borosilicate, titanium dioxide, antimony trioxide and a combination thereof. The lamp further includes at least one light emitting diode (LED) positioned within the hollow interior of the glass tube body.

In another aspect, a method of forming a lamp is provided that includes a glass tube body having a glass composition that includes an optical diffusive agent to increase the light diffusivity of the glass tube body. In one embodiment, the method of lamp assembly includes alloying a base glass composition with an optically diffusive agent selected from the group consisting of lithium borosilicate, titanium dioxide, antimony trioxide and a combination thereof. A glass melt of the base glass composition with the optically diffusive agent is then drawn into a tube geometry to provide a glass tube body. The method may further include positioning at least one light emitting diode within the hollow interior of the glass tube body. The optical diffusive agent alloyed with the base glass composition increases the light diffusivity of the glass tube body in which the at least one light emitting diode is present.

BRIEF DESCRIPTION OF THE DRAWINGS

The following description will provide details of embodiments with reference to the following figures wherein.

DETAILED DESCRIPTION

Figure 1:
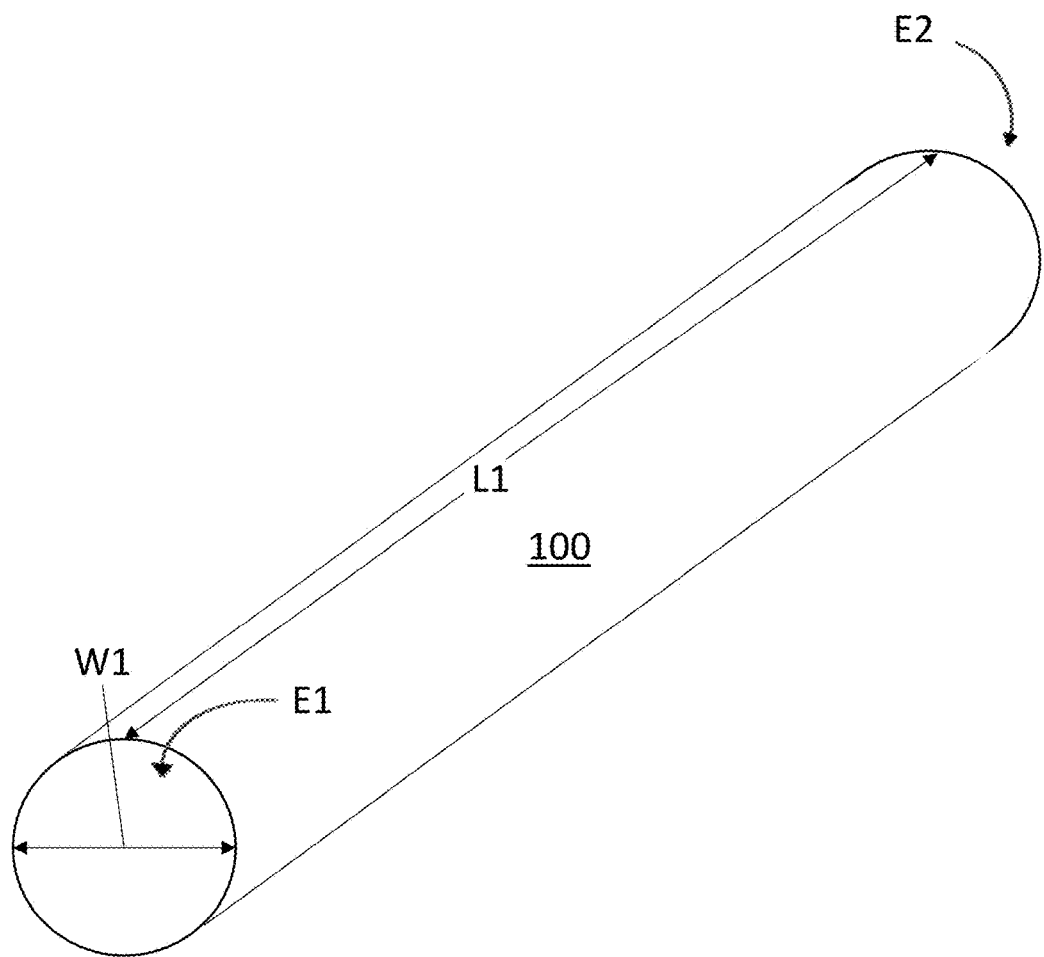
FIG. 1 is a perspective view of a glass tube body, in which the glass composition includes an optical diffusive agent to increase the light diffusivity of the glass tube body, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

As light emitting diode (LED) light sources become a more attractive solution to lighting in fluorescent type lighting fixtures, glass tubes have been considered for tube lighting employing light emitting diodes (LEDs). It has been determined that because individual LEDs emit light as point light sources, and light from those point light sources is not diffused, the effect of optical glare in tube lamps composed of glass, i.e., a lamp having a glass tube body, can be disadvantageously strong. When a string of a plurality of light emitting diodes (LEDs) is employed as the light source positioned within the hollow interior of a glass tube body, which typically has insufficient light diffusivity performance for light emitting diode (LED) lighting, each of the individual LEDs can be seen when the lamp is illuminated. This may be referred to as "hot spot patterning". The visual identification of the individual LEDs is not preferred. A lamp illuminating light uniformly along its length in a manner that represents a singular consistent light source is preferred to the non-uniform perception of lighting from the individual LEDs in a tube lamp having insufficient light diffusivity performance.

In some examples, diffusive coatings have been applied to glass tube bodies to increase the light diffusivity. The diffusive coatings can be applied to the interior sidewalls of the glass tube body. The difficulty with diffusive coatings, is the need for a scratch tolerant coating, and coatings using traditional phosphor coating process are not scratch tolerant. These types of coatings do not have the scratch tolerance to withstand the assembly process for forming LED lighting using tube lamp bodies, in which a printed circuit board that provides the substrate for the individual LEDs is inserted, into the hollow interior of the tube lamp body i.e., inserting by sliding in contact with sidewalk of the glass tube body. It has been determined that the scratch tolerant coatings have higher optical loss. In other examples, a diffusive plastic sheath can be attached onto the outside of glass tube body. The diffusive sheath can be applied to the exterior side of the glass tube body by using insert-and-shrink process. As the sheath is thin, there exist high risks of being scratched or even damaged due to material handling at manufacturing, transportation or installation. Additionally, "hot spot pattern" may still be an issue with diffusive sheath applications due to non-uniform diffusing if the sheathes are unevenly stretched. Additionally, the plastic sheath may have aging and yellowing problems when exposed to UV and blue light during the life time.

In some embodiments, the methods, structures and assemblies described herein can overcome the aforementioned disadvantages by providing a light emitting diode (LED) tube lamp composed of a self-diffusive, i.e., self-light diffusive, tubular glass. In some embodiments, the self-diffusive tubular glass does not include diffusive coatings, and does not include a diffusive sheath. The self-diffusive glass tube body that is employed by the methods, structures and assemblies described herein includes a glass tube body composed of a glass composition that includes an optical diffusive agent to increase the light diffusivity of the glass tube body. In some embodiments, the optically diffusive agent can be an index mismatching refractive type alloying agent, or a reflective type alloying agent, or a combination of index mismatching refractive type alloying agent and a reflective type alloying agent. The difference in the refractive index of the base glass composition of the glass tube body and the mismatching refractive type alloying agent and/or the interaction between the reflective type alloying agent and the base glass composition of the glass tube body causes light scattering effects that increase the light diffusivity performance of the glass tube body. By increasing the light diffusivity performance of the glass tube body with the addition of the optically diffusive agent, the glass tube body contributes to more uniform light diffusion for the light emitted from the plurality of light emitting diodes (LEDs) that are present in the hollow interior of the glass tube body in the lamp assembly. Further, because the high diffusive tubular glass that results from the optically diffusive agent alloyed with the base glass composition of the glass tube body increases the light diffusivity of the glass, interior diffusivity coatings, and exterior diffusive plastic sheaths are not needed, and hence eliminated. This provides for a more relaxed manufacturing process. In some embodiments, the self-diffusive glass tube body provides an interior sidewall surface that is scratch resistant, i.e., sufficient for light emitting diode (LED) board mounting. In some embodiments, the self-diffusive glass tube body provides for an exterior sidewall surface that is also scratch resistant, which is advantageous for manufacturing, transportation, as well as handing during installation. The methods, structures and assemblies of the present disclosure are now described with further detail with reference to FIGS. 1-10.

Figure 2:
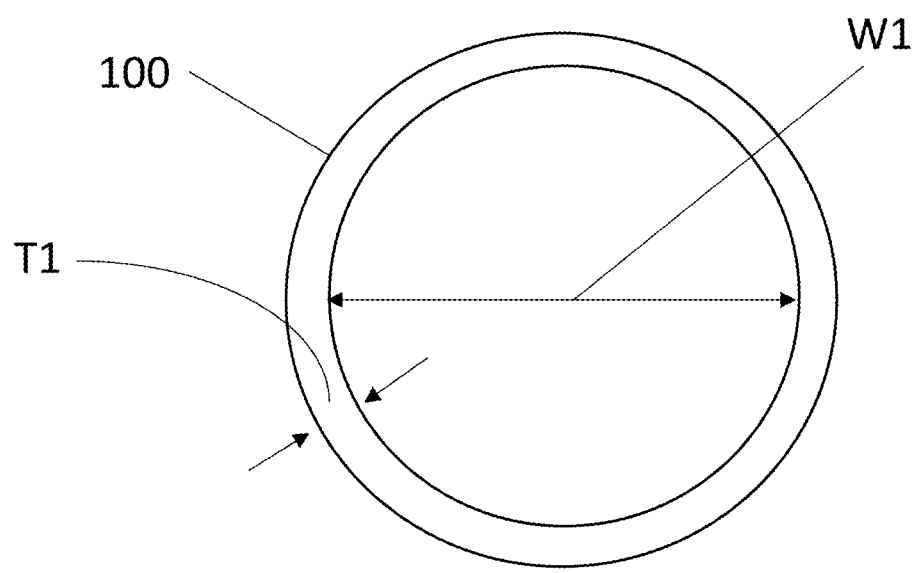
FIG. 2 is a side cross-sectional view of a portion of a glass tube body that is depicted in FIG. 1.

FIGS. 1 and 2 depict one embodiment of a lamp tube including a glass tube body 100 having a perimeter defined by a sidewall of the glass tube body 100 for enclosing a hollow interior, in which the hollow interior has dimensions for housing a light source 200 including at least one light emitting diode (LED) 201. The glass tube body 100 can be composed of a sodium silicate glass including an optically diffusive agent that is alloyed with the sodium silicate glass. The term "glass" denotes the material of the glass tube body 100 is composed of an amorphous solid material. In some embodiments, optically diffusive agent can be an alloying agent that is mixed with the majority constituents of the glass tube body 100 composition that can be an index mismatching refractive type alloying agent, or a reflective type alloying agent, or a combination of the index mismatching refractive type alloying agent and the reflective type alloying agent. The difference in the refractive index of the base glass composition of the glass tube body 100 and the mismatching refractive type alloying agent and/or the interaction between the reflective type alloying agent and the base glass composition of the glass tube body 100 causes light scattering effects that increase the light diffusivity performance of the glass tube body 100. The optically diffusive agent selected from the group consisting of lithium borosilicate, titanium dioxide, antimony trioxide and a combination thereof.

The majority constituents, i.e., base composition, of the glass tube body 100 may be any of various amorphous materials formed from a melt by cooling to rigidity without crystallization, such as a transparent or translucent material composed of a mixture of silicates. In some embodiments, one type of glass that can provide the base composition for the glass tube body 100 is a "soda-lime" glass. In general, soda-lime glass contains a percentage of sodium oxide and calcium oxide dispersed in silicon dioxide (silica), which forms the major component of the glass. Soda-lime glasses useful for the glass tube body 100 may contain from 5 wt. % to 45 wt. % by weight of soda-lime. In some other embodiments, the soda-lime glass used in the glass tube body 100 may contain from 20 wt. % to 25 wt. % by weight soda-lime.

The optically diffusive agent may be present in the base composition of the glass tube body 100 may range from 0.2% to 30% by weight. In another example, the optically diffusive agent may be present in the base composition of the glass tube body 100 may range from 0.5% to 25% by weight of the glass composition for the glass tube body 100. In other examples, the optically diffusive agent may be present in the glass composition for the glass tube body 100 in an amount equal to 0.25 wt. %, 0.5 wt. %, 1 wt. %, 5 wt. %, 10%, 20%, or 30%, or any range of wt. % in which one of the aforementioned values provides the lower limit of the range, and one of the aforementioned values provides the upper limit of the range, as well as any value within those ranges.

In some embodiments, the optically diffusive agent may be an index mismatched refractive type alloying agent. One example of an index mismatched refractive type alloying agent is lithium borosilicate. An index mismatched refractive type alloying agent of lithium borosilicate may be formed by alloying a glass composition of lithium borate $(Li_2O).B_2O_3$ with silica $(SiO_2)$. In one example, the lithium borosilicate that provides the optically diffusive agent has the chemical formula $42.5\ Li_2O.(57.5-x)B_2O_3-xSiO_2$ (x=0-57.5). The refractive index mismatch is the difference between the refractive index of the lithium borosilicate and the refractive index of the soda lime silicate glass. For example, in some embodiments, the refractive index of the soda lime silicate glass ranges from 1.5 to 1.53, while the refractive index of the lithium borosilicate glass of the index mismatched refractive type alloying agent, i.e., optically diffusive agent, may range from 3.2 to 4.0.

In one example, when the glass composition used for the glass tube body 100 is a soda lime silicate glass that includes an optically diffusive agent that provides a refractive index mismatch, the glass composition for the soda lime silicate glass may contain a base glass composition of 60-75 wt. % silica $(SiO_2)$, 12-18 wt. % soda $(Na_2O)$, and 5-12 wt. % lime CaO) and an optically diffusive agent of 2-20 wt. % lithium borosilicate.

Silica $(SiO_2)$ is a glass former. At high temperatures, silica $(SiO_2)$ liquefies into a very viscous melt that general impedes crystallization kinetically when it goes below its melting temperature. However, silica $(SiO_2)$ melts at 1713° C. Temperatures in excess of 2000° C. can be attained to work pure silica $(SiO_2)$ glasses. Soda $(Na_2O)$ is a flux, and its addition reduces the melting temperature of the silica melt. However, its addition also makes the resulting glass soluble in water. Lime (CaO) is a stabilizer. Although an excess of calcium oxide to a silica melt will cause devitrification, additions of small amounts of lime stabilize the glass melt with respect to water, fixing the problem of water solubility introduced with the soda component. It is noted that the aforementioned constituents can provide one example of a base composition for the glass tube body, and typically provides a clear glass having a refractive index ranging from 1.50 to 1.53.

The lithium borosilicate is an example of an index mismatching refractive type optically diffusive agent. For example, lithium borosilicate typically has a refractive index ranging from 3.2 to 4.0. The difference in the refractive index of the base glass composition of the glass tube body 100 causes light scattering effects that increase the light diffusivity performance of the glass tube body 100. By increasing the light diffusivity performance of the glass tube body 100 with the addition of the optically diffusive agent, the glass tube body 100 contributes to more uniform light diffusion for the light emitted from the plurality of light emitting diodes (LEDs) 201 that are present in the hollow interior of the glass tube body 100 in a lamp assembly. For example, the increased light diffusivity reduces the incidence of hot spot patterning of light emitted by the individual light emitting diodes (LEDs) 201 of the light source 200 that is positioned within the hollow interior of the glass tube body 100.

It is noted that lithium borosilicate is only one example of an index mismatching refractive type alloying agent that can provide the optically diffusive agent for the glass compositions that provide the high diffusive tubular glass for the glass tube body 100 can reduce the incidence of hot spot patterning when serving as the lamp tube body 100 of a light emitting diode (LED) tubular lamp. The present disclosure is not limited to only this example. For example, any glass additive having are refractive index greater than 1.75 when employed with the a soda lime silicate base glass composition is suitable for use with the methods and structures of the present disclosure. In some examples, an index mismatching refractive index may also be provided by lead oxide (PbO), barium oxide (BaO) and combinations thereof, which ay be substituted for or used in combination with lithium borosilicate In some other embodiments, the optically diffusive agent that is alloyed with the base glass composition to increase the light diffusivity of the glass tube body 100 may be reflective type alloying agent. Examples of reflective type alloying agents can include titanium dioxide $(TiO_2)$ and antimony trioxide $(Sb_2O_3)$. The interaction between the reflective type alloying agent of the optically diffusive agent and the base glass composition of the glass tube body 100 causes light scattering effects that increase the light diffusivity performance of the glass tube body 100.

In one example, when the glass composition used for the glass tube body 100 is a soda lime silicate glass that includes a reflective type alloying agent of titanium dioxide $(TiO_2)$, the glass composition for the soda lime silicate glass may contain a base glass composition of 60-75% silica $(SiO_2)$, 12-18% soda $(Na_2O)$, and 5-12% lime (CaO)); and an optically diffusive agent of 2-20% titanium dioxide $(TiO_2)$.

In one example, when the glass composition used for the glass tube body 100 is a soda lime silicate glass that includes a reflective type alloying agent of antimony trioxide $(Sb_2O_3)$, the glass composition for the soda lime silicate glass may contain a base glass composition of 60-75% silica $(SiO_2)$, 12-18% soda $(Na_2O)$, and 5-12% lime (CaO); and an optically diffusive agent of 2-20% of antimony trioxide $(Sb_2O_3)$.

The reflective type alloying agent for the optically diffusive agent is not limited to only the above examples of titanium dioxide $(TiO_2)$ and antimony trioxide $(Sb_2O_3)$, as it is contemplated that other reflective type alloying agents can be suitable for providing the optically diffusive agent.

It is also noted, that the optically diffusive agent is not limited to use with only sodium silicate type base glass compositions, e.g., soda lime silicate glasses. In some embodiments, the optically diffusive agent may be used in combination with borosilicate glass compositions. Borosilicate glass is a silicate glass having at least 5% of boric oxide in its composition. In one example, when the glass composition used for the glass tube body 100 is a borosilicate glass that is alloyed with an optically diffusive agent, the glass composition for the borosilicate glass may contain a base glass composition of 60-75% silica $(SiO_2)$, 12-18% soda $(Na_2O)$, 5-12% lime (CaO), and greater than 5% boric acid; and 10-20% of an optically diffusive agent that is selected from the group consisting of lithium borosilicate, titanium dioxide, antimony trioxide and a combination thereof.

It is noted that above glass compositions are provided for illustrative purposes only, and are not intended to limit the glass tube body 100 to only the compositions that are described above, as any glass composition is suitable for use with the glass tube body 100. For example, glasses containing potassium oxides, barium oxides, strontium oxides and aluminum oxides, with or without a small percentage of lead, may also be used for the composition of the glass tube body 100, and may also be alloyed with the aforementioned optically diffusive agent that is selected from the group consisting of lithium borosilicate, titanium dioxide, antimony trioxide and a combination thereof. In other examples, the glass composition may include alkaline earth aluminosilicate, alkali aluminosilicate glass, an alkali borosilicate glass, a boroaluminosilicate glass or a combination thereof that can be alloyed with the aforementioned optically diffusive agent that is selected from the group consisting of lithium borosilicate, titanium dioxide, antimony trioxide and a combination thereof. The glass tube body 100 does not include polymeric or plastic compositions.

By increasing the light diffusivity performance of the glass tube body 100 with the addition of the optically diffusive agent, the glass tube body 100 contributes to more uniform light diffusion for the light emitted from the plurality of light emitting diodes (LEDs) 201 that are present in the hollow interior of the glass tube body 100 in the lamp assembly. Further, because the high diffusive tubular glass that results from the optically diffusive agent alloyed with the base glass composition of the glass tube body 100 increases the light diffusivity of the glass, interior diffusivity coatings, and exterior diffusive plastic sheaths are not needed, and hence eliminated.

In some embodiments, the glass tube body 100 has a scatter ratio of 0.5 or more for visible wavelengths between 400 nm and 700 nm. In some other embodiments, the glass tube body 100 has a scatter ratio of 0.75 or more for visible wavelengths between 400 nm and 700 nm. In further embodiments, the glass tube body 100 has a scatter ratio of 0.80 or more for visible wavelengths between 400 nm and 700 nm. In yet another embodiment, the glass panel has a scatter ratio of 0.85 or more for visible wavelengths between 400 and 700 nm. In an even further embodiment, the glass tube body 100 has a scatter ratio of 0.90 or more for visible wavelengths between 400 nm and 700 nm. In yet a further embodiment, the glass tube body 100 has a scatter ratio of 0.95 or more for visible wavelengths between 400 and 700 nm.

It is noted that the scatter ratio may include any range including a lower limit to the range selected from one of the aforementioned lower limit examples (e.g., scatter ratio of 0.5 or more), and an upper limit selected from one of the aforementioned lower limit examples (e.g., scatter ration of 0.95 or more). For example, in some embodiments, the scatter ratio may range from 0.5 to 0.95 for visible wavelengths between 400 nm and 700 nm. In another example, in some embodiments, the scatter ratio may range from 0.75 to 0.85 for visible wavelengths between 400 nm and 700 nm.

Referring to FIGS. 1-2, in some embodiments, the glass tube body 100 has a cross-sectional geometry that is perpendicular to a length L1 of the glass tube body 100 with a substantially cylindrical perimeter defined by a sidewall of the glass tube body 100 enclosing a hollow interior for housing a light source, e.g., light emitting diode (LED) light source. The length L1 of the glass tube body 100 extends from a first end E1 of the glass tube body 100 for engagement by a first end cap 300 to a second end E2 of the glass tube body 100 for engagement of a second end cap 300. The length L1 of glass tube body 100 is greater than a width W1 (diameter) of the glass tube body 100. In some embodiments, the length L1 of the glass tube body 100 may range from 5" to 100", and the width W1, i.e., diameter, of the glass tube body 100 may range from 0.5" to 2.0". In one embodiment, the thickness T1 of the glass sidewall for the glass tube body 100 may range from 0.5 mm to 1.1 mm. It is noted that this example for the thickness T1 of the glass sidewall is only one example, and is not intended to be limiting.

The dimensions, i.e., length and width W1, of the glass tube body 100 may be selected to be consistent with the standard sizes of T5, T8 and T12 fluorescent type lamps. For example, the length L1 and width W1 of the glass tube body 100 may be selected to be consistent with the T5 standard for fluorescent type lamps. In this example, the glass tube body 100 can have a width W1 (diameter) that can be ⅝", i.e., 0.625", and a length L1 that can be 12", 24", 36", 48" or 60". In another example, the length L1 and width W1 of the glass tube body 100 may be selected to be consistent with the T8 standard for fluorescent type lamps. In this example, the glass tube body 100 can have a width W1 (diameter) that is ⅝", i.e., 1.0", and a length L1 that can be 12", 24", 36", 48" or 60". In yet another example, the length L1 and width W1 of the glass tube body 100 may be selected to be consistent with the T12 standard for fluorescent type lamps. In this example, the glass tube body 100 can have a width W1 (diameter) that can be 12/8", i.e., 1.5", and a length L1 that can be 12", 24", 36", 48" or 60".

The width dimension W1 for the hollow interior of the glass tube body 100 is selected so that the width of the hollow interior is sufficient for housing a light source, such as surface mount device (SMD) light emitting diodes (LEDs) present upon a light emitting diode (LED) board, such as a circuit board, e.g., printed circuit board.

Figure 3:
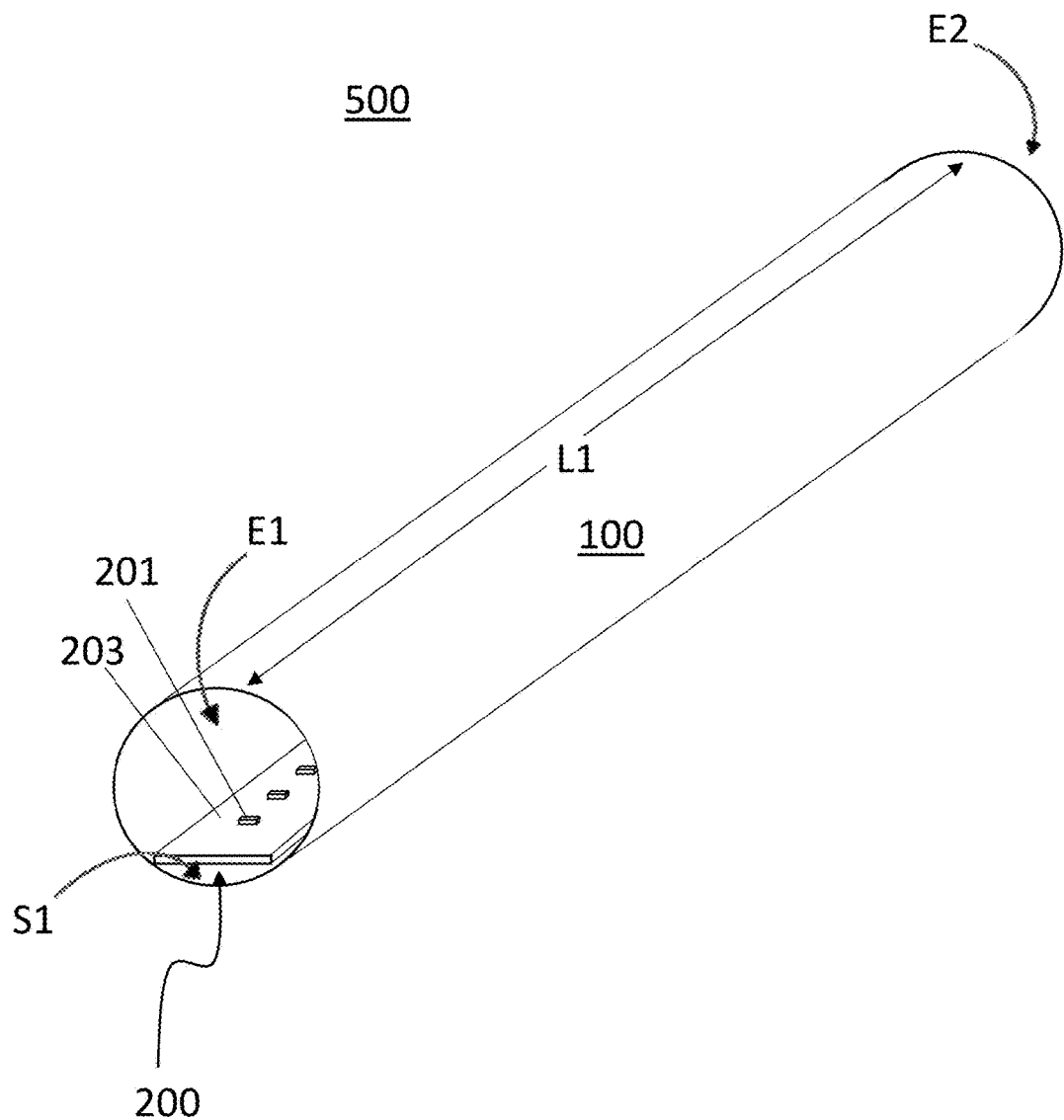
FIG. 3 is a perspective view of a lamp that includes a glass tube body having a glass composition that includes an optical diffusive agent to increase the light diffusivity of the glass tube body, in which the end caps are not depicted to illustrate the positioning of the light emitting diode (LED) light source within the interior of the glass tube body, in accordance with one embodiment of the present disclosure.
Figure 4:
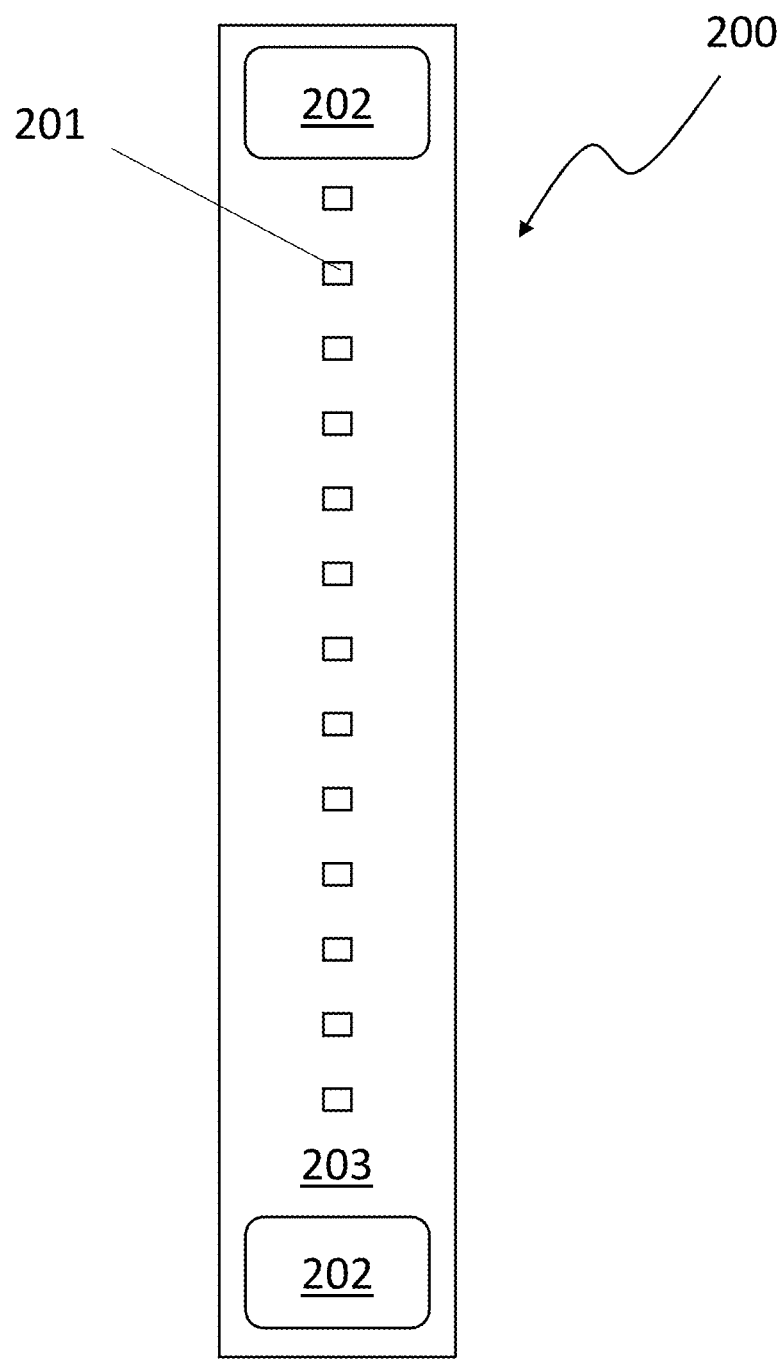
FIG. 4 is a top down view of a light source that can be housed within the glass tube body that is depicted in FIGS. 1-3, in which the light source includes a plurality of surface mount device (SMD) light emitting diode (LED) present on a circuit board, in accordance with at least one embodiment of the present disclosure.
Figure 5:
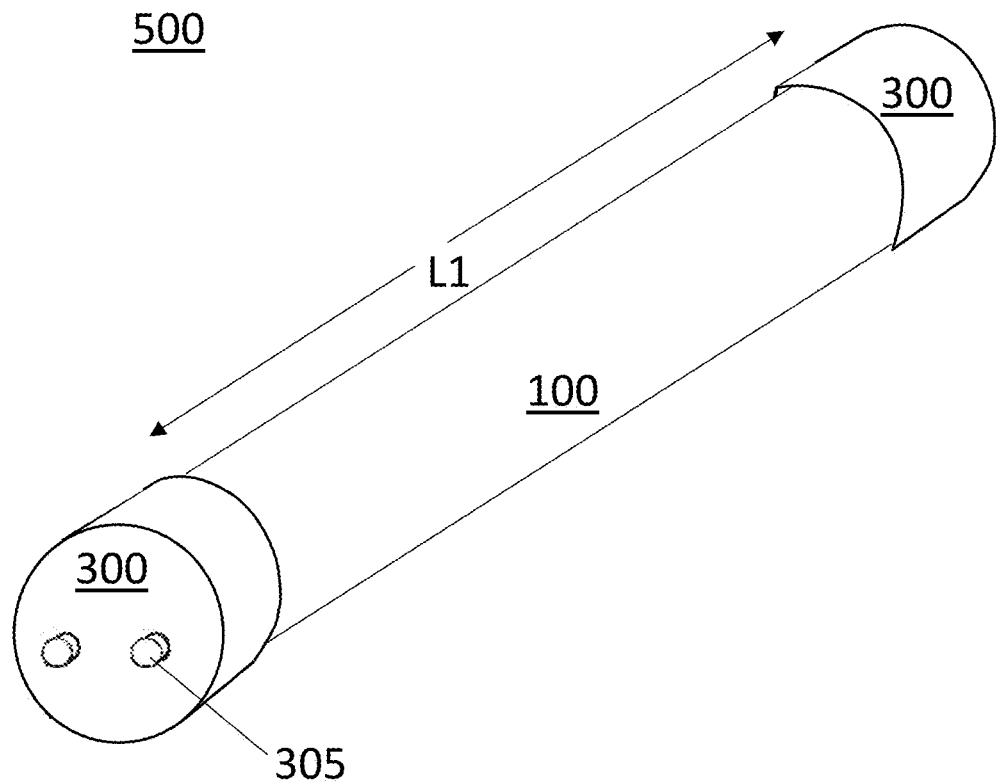
FIG. 5 is a perspective view of an assembled lamp that includes a glass tube body having a glass composition that includes an optical diffusive agent to increase the light diffusivity of the glass tube body, alight source housed on a circuit board engaged to the glass tube body within its hollow interior, and end caps at opposing ends of the assembled lamp, in accordance with one embodiment of the present disclosure.

In another aspect, the glass tube body 100 that has been described with reference to FIGS. 1-2 is integrated into a light emitting diode (LED) tube lamp 500, and methods of forming the lamp, as depicted in FIGS. 3-5. In some embodiments, the glass tube body 100 for the lamp 500 is composed of self-diffusive tubular glass, in which the glass composition of the glass tube body includes an optically diffusive agent, which provides light diffusivity performance. The glass compositions including the optically diffusive agent, such as lithium borosilicate, titanium dioxide, antimony trioxide or combinations thereof, have been described above with reference to FIGS. 1 and 2. The glass compositions described for the glass tube body 100 depicted in FIGS. 1 and 2 is applicable for providing the composition of the glass tube body 100 that is employed in the tube lamps 500 depicted in FIGS. 3-5. The light diffusivity performance of the glass tube body 100 that is provided by the glass composition including the optically diffusive agent allows for the glass tube body 100 to house a plurality of light emitting diodes (LEDS) as a light source within the hollow interior of the glass tube body 100, wherein illumination of the LEDs within the glass tube body 100 does not result in hot spot patterning. "Hot spot patterning" occurs when the light diffusivity performance of the glass is insufficient, and instead of the point light sources provided by the LEDs providing light in a uniform representation, the point light sources when illuminated are visually perceived individually, i.e., as spots of light. The glass composition of the glass tube body 100 including the optically diffusive agent can provide that the light emitted by the plurality of light emitting diodes (LEDs) 201 of the light source 200 that is contained within the interior of the glass tube body 100 is perceived by individuals viewing the exterior of the illuminated lamp 500 as a unitary conformal light source that is free of hot spot patterning extending the entire length L1 of the glass tube body 100 from its first end E1 to its second end E2.

FIG. 3 depicts a lamp 500 that includes a glass tube body 100 having a glass composition with an optically diffusive agent, in which end caps 300 are not depicted to illustrate the positioning of the light emitting diode (LED) light source 200 within the interior of the glass tube body 100. The light source 200 can be provided by a light emitting diode (LED) 201 and the substrate 203 can be a circuit board, e.g., printed circuit board (PCB), on which the LEDs 201 are mounted as surface mount devices (SMDs). In addition to semiconductor type light emitting diodes (LEDs), the light source 200 may be organic light emitting diodes, laser diodes or any like light source. Although other light sources and substrates are suitable for use with the glass tube body 100 that is described herein in providing a lamp 500, the light source 200 is specifically referred to hereafter as having light emitting diodes 201, and the substrate 203 is hereafter referred to as a circuit board 203, e.g., printed circuit board.

FIG. 4 depicts one embodiment of a light source 200 that can be housed within the glass tube body 10 that is depicted in FIGS. 1-3, 5, 9 and 10, in which the light source 200 includes a plurality of surface mount device (SMD) light emitting diode (LED) 201 present on a circuit board 203. A light emitting diode (LED) 201 is a light source that can be a semiconductor device that emits visible light when an electric current passes through it. The LEDs 201 of the light source 200 can include at least one LED 201, a plurality of series-connected or parallel-connected. LEDs 201, or an LED array 201. At least one LED array for the light source 200 can include a plurality of LED arrays. In the embodiment that is depicted in FIG.4, LEDs 201 may also be arranged in a single column that extends along a majority of the length of the circuit board 203. In some other embodiments, the LEDs 201 can be arranged in multiple columns, e.g., three columns.

Any type of LED may be used in the LEDs 201 of the light source 200. For example, the LEDs 201 of the light source 200 can be semiconductor LEDs, organic light emitting diodes (OLEDs), semiconductor dies that produce light in response to current, light emitting polymers, electroluminescent strips (EL) or the like. The LEDs 201 can be mounted to the circuit board 203 by solder, a snap-fit connection, or other engagement mechanisms. In some examples, the LEDs 201 are provided by a plurality of surface mount discharge (SMD) light emitting diodes (LED) arranged in a plurality of lines on the circuit board 203.

In some embodiments, the LEDs 201 of the light source 200 can produce white light. However, LEDs 201 that produce blue light, purple light, red light, green light, ultra-violet light, near ultra-violet light, or other wavelengths of light can be used in place of white light emitting LEDs 201. In some embodiments, the emission wavelengths for the LEDs 201 of the light source 200 can range from approximately 400 nm to approximately 470 nm, or the emission wavelengths for the LEDs 201 of the light source 200 can range from approximately 300 nm to approximately 400 nm.

The number of LEDs 201 for the light source 200 can be a function of the desired power of the lamp 500 and the power of the LEDs 201. For example, for a 48" lamp 500, the number of LEDs 201 that are present on the circuit board 203 of the light source can vary from about 5 LEDs 201 to about 400 LEDs 201, such that the lamp 500 outputs approximately 500 lumens to approximately 3,000 lumens.

The LEDs 201 for the light source 200 can be mounted on a circuit hoard 203, such as a printed circuit board (PCB). A printed circuit board (PCB) mechanically supports and electrically connects electronic components, such as the LEDs 201 and the driving electronics 202, using conductive tracks, pads and other features etched from copper sheets laminated onto a non-conductive substrate. The printed circuit hoard 203 is typically composed of a dielectric material. For example, the circuit board may be composed of fiber-reinforced plastic (FRP) (also called fiber-reinforced polymer, or fiber-reinforced plastic) is a composite material made of a polymer matrix reinforced with fibers. The fibers are usually glass, carbon, aramid, or basalt. The polymer is usually an epoxy, vinylester, or polyester thermosetting plastic, though phenol formaldehyde resins are still in use. In sonic embodiments, the printed circuit board (PCB) is composed of a composite consistent with the above description that is called FR-4. The printed circuit board 203 may be made in one piece or in longitudinal sections joined by electrical bridge connectors.

Still referring to FIG. 4, the printed circuit board 203 may further include internal built in regulating electronics, i.e., LED driver 202, and printed circuitry providing electrical communication between the regulating electronics and the LEDs 201, e.g., surface mount discharge (SMD) light emitting diodes (LED). The LED driver 202 is an electrical device which regulates the power to the LED 201, or a string (or strings) of LEDs 201. In some embodiments, the LED driver 202 responds to the changing needs of the LEDs 201, or LED circuit, by providing a constant quantity of power to the LED 201 as its electrical properties change with temperature. In some embodiments, an LED driver 202 is a self-contained power supply which has outputs that are matched to the electrical characteristics of the LED or LEDs 201. In some embodiments, the LED driver 202 may offer dimming by means of pulse width modulation circuits and may have more than one channel for separate control of different LEDs or LED arrays 201. The power level of the LED 201 is maintained constant by the LED driver 202 as the electrical properties change throughout the temperature increases and decreases seen by the LED or LEDs 201. In some embodiments, the supply voltage of the LED driver 202 may be equal to 2.3V to 5.5 V, 2.7V to 5.5 V and/or 3V to 5.5 V. In some embodiments, the output current per channel that can be provided by the LED driver 202 can be between 250 µA and 50 A. In some other embodiments, the LED driver 202 can have an output current per channel ranging from 20 mA to 100 mA, e.g., 25 mA. The LED driver 202 can be present at either end of the printed circuit board 203, or two LED drivers 202 may be present on the printed circuit board 203 with one LED driver 202 at each end.

The light source 200 may be engaged to the interior surface S2 of the sidewall of the glass tube body 100 adhesively, or mechanically, e.g., with fasteners. In another embodiment, the light source 200 may be engaged to the interior surface S2 of the sidewall of the glass tube body 100 by fitment to ridges (not shown). The retaining ridges having a geometry for engaging a surface of the light source with an apex directed towards the hollow interior, in which the ridges uniformly extend along a majority of the glass tube body 100 length. In another embodiment, the light source 200 may be engaged to the interior surface S2 of the sidewall of the glass tube body by burlings having a geometry for engaging the light source. The burlings are point impressions in the glass tube body 100 providing an apex extending towards the hollow interior of the glass tube body 100.

FIG. 5 depicts one embodiment of an assembled lamp 500 including a glass tube body 100 having a glass composition with an optically diffusive agent to increase light diffusivity performance of the glass tube body 100; a light source 200, e.g., light source provided by a plurality of light emitting diodes (LEDs) 201 housed on a circuit board 203 engaged to the glass tube body 100 within its hollow interior; and end caps 300 at opposing ends of the assembled lamp 500. The end caps 300 have electrical contacts for communication between a lamp fixture and the LED driver 202 of the light source 200, hence providing a lamp 500. In some embodiments, each of the end caps 300 are composed of a polymeric material, such as silicone; a metal material, such as aluminum, or a combination, i.e., assembly, thereof. The end caps 300 have a sidewall having a diameter and geometry that is sufficient to fit over the ends E1, E2 of the glass tube body 100. For example, the majority of the cross-section of the end caps 300 can be substantially circular matching the cross-section of the glass tube body 100. In some embodiments, the end faces of each end cap 300 include a pair of contacts 305 for engagement with a lamp fixture. The contacts 305 are typically composed of a metal, such as aluminum, steel or copper. In some embodiments, the contacts 305 may have a pin type geometry. For example, when the lamp 500 has a geometry for the T4 (13 mm) standard, the contacts 305 may be a pin type contact, in which the pins are separated by 5 mm. In another example, when the lamp 500 has a geometry for the T5 (16 mm) standard, the contacts 305 may be a pin type contact, in which the pins are separated by 5 mm. In yet another example, when the lamp 500 has a geometry for the T8 standard (26 mm), the pins may be separated by a distance of 13 mm. In an even further example, when the lamp 500 has a geometry for the T12 standard (38 mm), the pins may be separated by a distance of 13 mm. The geometry of the contacts 305 is not limited to only pin type geometries. For example, the geometry of the contacts 305 may be provided by peg fittings, single oval fittings, double oval fittings, as well as other contact geometries typically employed in lighting applications.

In some embodiments, wires (not shown) can provide electrical communication between the end caps 300, i.e., the contacts 305 of the end caps 300, to the electrical components of the circuit board 203, such as the electronics driver 202 for the LEDs 201, In some embodiments, the wires are made of metals, and preferably made of copper or steels. Electrical junctions can be provided through mechanical fasteners, such as nut and bolt arrangements, and/or solder like connections.

In another aspect of the present disclosure, a method of assembling a lamp 500 is provided, as depicted in FIGS. 6-10. In one embodiment, the method includes a sequence that can provide the glass tube body 100 that is described with reference to FIGS. 1-2, and. can provide the lamp 500 including the glass tube body 100 that is described with reference to FIGS. 3-5. The method of forming the lamp 500 can include a glass tube body 100 composed of self-diffusive tubular glass that includes an optically diffusive agent to increase the light diffusivity performance of the glass. In some embodiments, the optical diffusive agent alloyed with the base glass composition increases the light diffusivity of the glass tube body, which reduces the incidence of hot spot patterning in glass tubes formed from alloyed base glass compositions. Embodiments of glass compositions including optically diffusive agents, such as lithium borosilicate, titanium dioxide, antimony trioxide or combinations thereof, have been described above with reference to FIGS. 1 and 2; and are applicable for providing the composition of the glass that is employed in the methods of lamp assembly described with reference to FIGS. 6-10.

Figure 6:
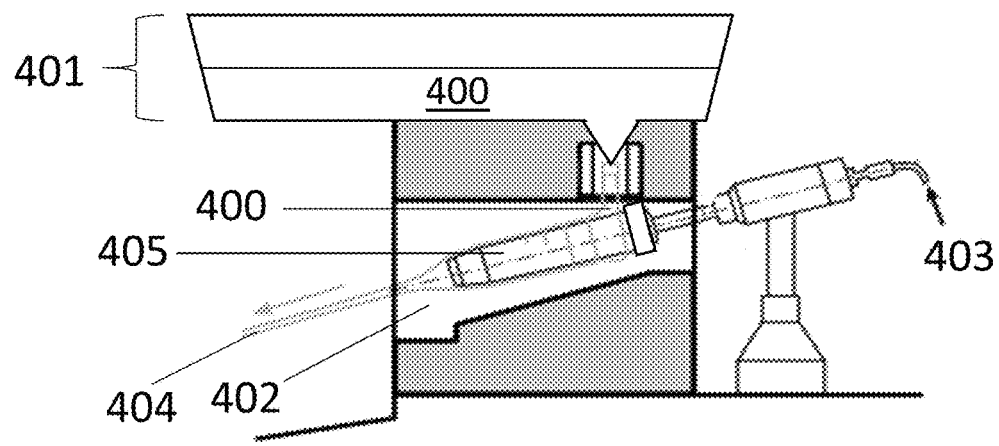
FIG. 6 is a side cross-sectional view of a glass tube forming apparatus for Danner process glass tube formation, in accordance with one embodiment of the present disclosure.
Figure 7:
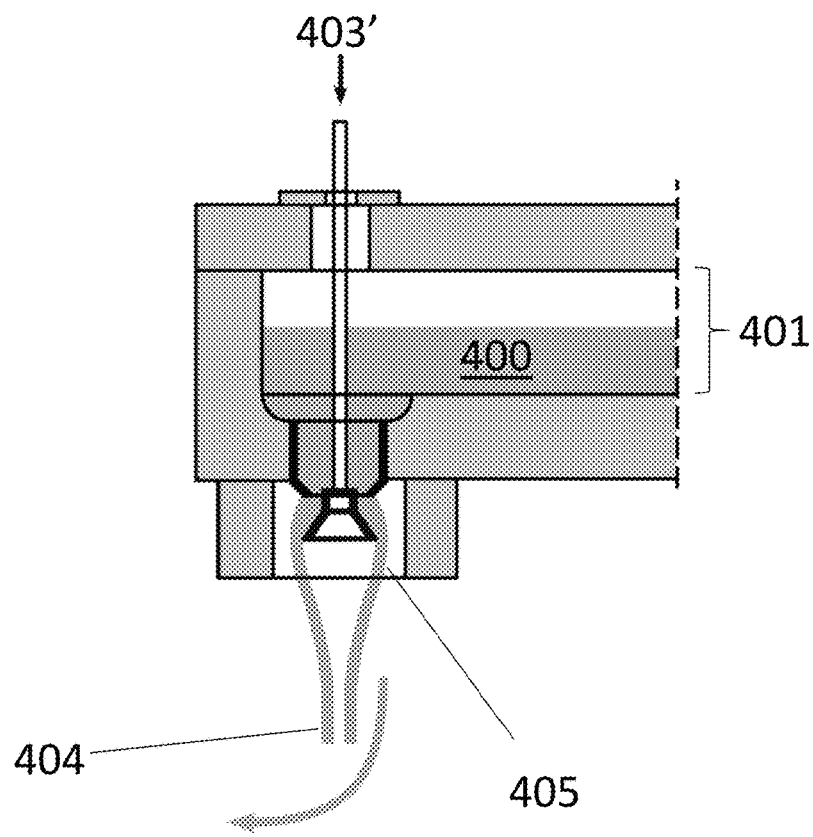
FIG. 7 is a side cross-sectional view of a glass tube forming apparatus for Vello process glass tube formation, in accordance with one embodiment of the present disclosure.
Figure 8:
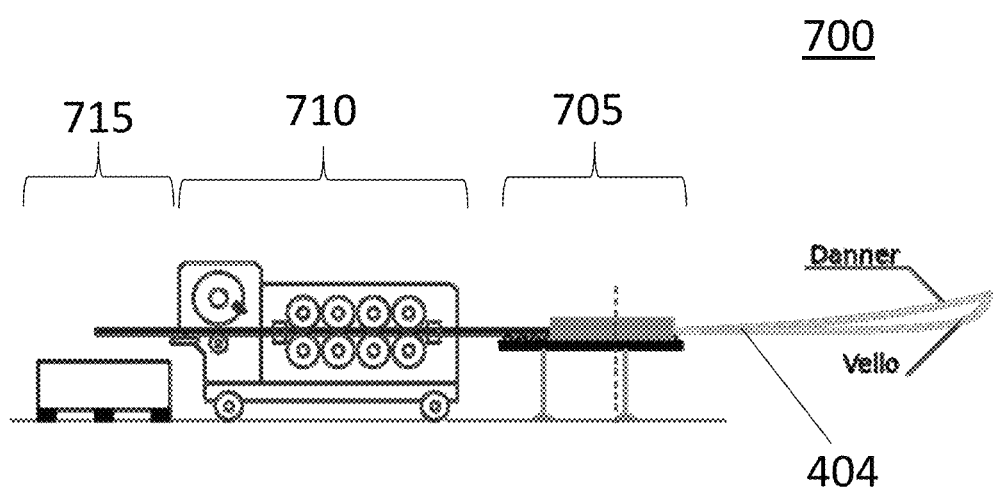
FIG. 8 is a schematic illustrating a production line for vertical tube drawing that can be used with the Vello and Danner type tube drawing methods, in accordance with one embodiment of the present disclosure.
Figure 9:
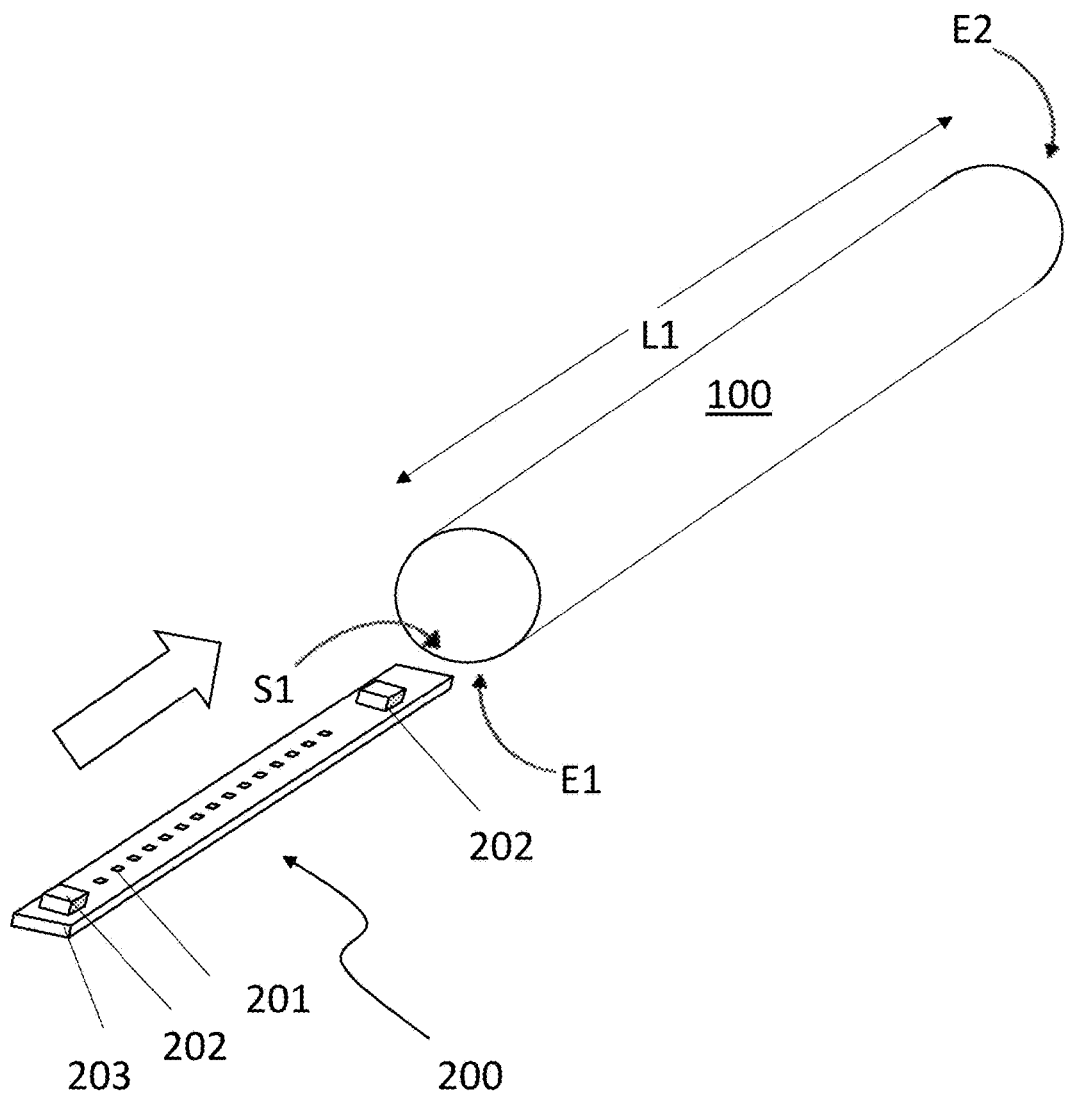
FIG. 9 is a perspective view illustrating sliding a circuit board including at least one light source into a hollow interior of a glass tube body, in accordance with one embodiment of the present disclosure.
Figure 10:
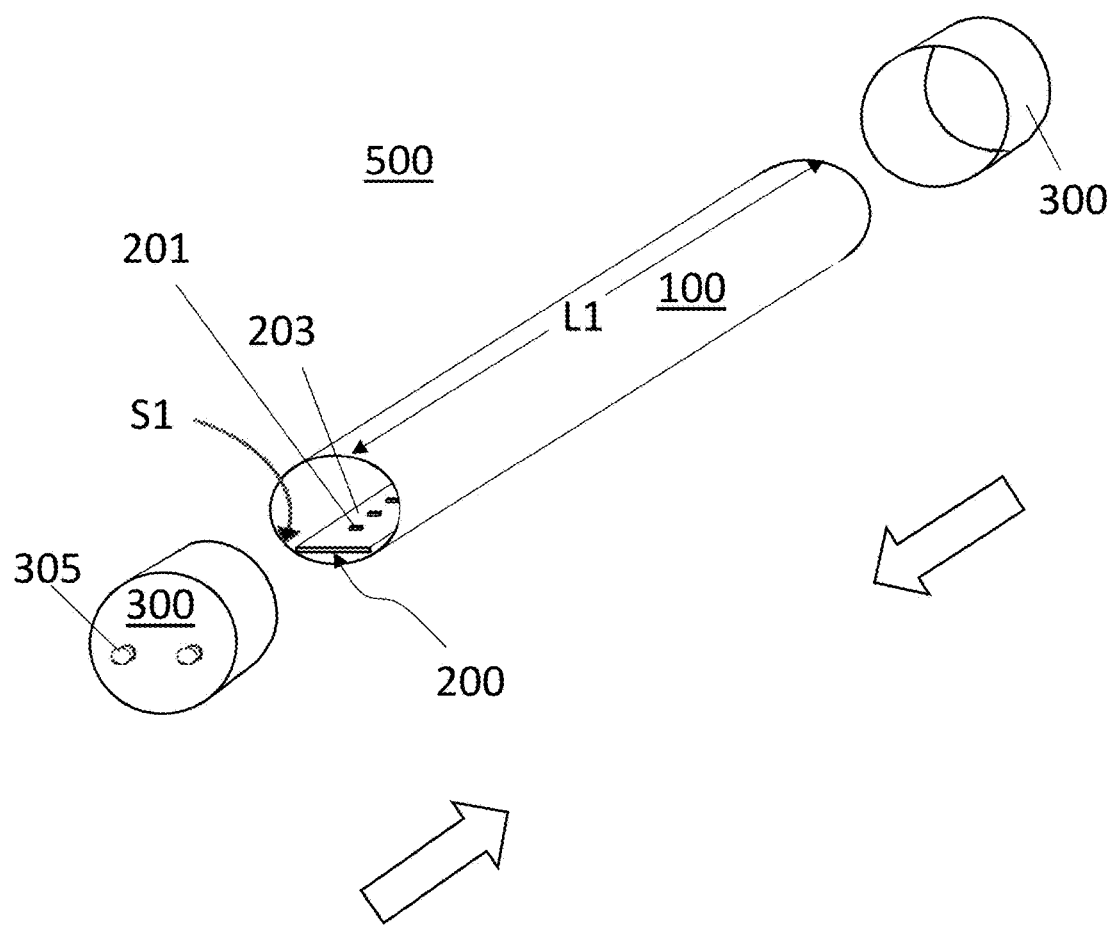
FIG. 10 is a side cross-sectional view depicting installing end caps having electrical contacts for electrical communication with a lamp fixture to the glass tube body that is depicted in FIG. 9, in accordance with one embodiment of the present disclosure.

In some embodiments, the method of lamp assembly includes alloying a base glass composition including a silicate glass with an optically diffusive agent selected from the group consisting of lithium borosilicate, titanium dioxide, antimony trioxide and a combination thereof. A melt of the base glass composition including the silicate glass with the optically diffusive agent is then drawn into a tube geometry to provide a glass tube body 100, as depicted in FIGS. 6-8. In one embodiment, the lamp assembly method can further include positioning a circuit board 203 including a plurality of light emitting diodes 201 within the hollow interior of the glass tube body 100, as depicted in FIG. 9. FIG. 10 depicts one embodiment of installing end caps 300 having electrical contacts for electrical communication with a lamp fixture 500 to the glass tube body 100 that is depicted in FIG. 9. The method of lamp assembly is described in more detail below with reference to FIGS. 6-10.

The method may begin with glass batching operations to provide the raw materials for producing a glass melt of a glass composition including the optically diffusive agent. The batch composition for preparing the molten glass for tube forming can be selected from fritted and un-fritted glass making material. Soda-lime glass is prepared by melting the raw materials, such as sodium carbonate (soda), lime, dolomite, silicon dioxide (silica), aluminium oxide (alumina), and small quantities of fining agents (e.g., sodium sulfate, sodium chloride) in a glass furnace at temperatures locally up to 1675° C. The optical diffusive agent may be mixed with the base glass composition during the batching process, or mixed with the base glass composition during the melting process. Embodiments of glass compositions including optically diffusive agents, such as lithium borosilicate, titanium dioxide, antimony trioxide or combinations thereof, have been described above with reference to FIGS. 1 and 2. The glass batch materials are melted in a glass making furnace. The molten glass flows from a melting portion of the furnace to a refining or conditioning portion of the furnace, where it is gradually cooled to about 1150° C. (i.e. about log 3 viscosity). The molten glass (also referred to as glass melt) is identified by reference number 400 in FIG. 6-8.

The glass tube body 100 including the optical diffusive agent may be formed from the glass melt 400 by a forming process, as depicted in FIGs. 6-8. In some embodiments, the forming process may be a glass drawing used for forming glass tubing, such as the Danner process, updraw, downdraw, Vello process or a combination thereof. In each of these process, the glass melt can be fed continuously into one end of a large tank furnace at a rate which balances that at which the molten glass is delivered to forming machines at the other end.

Tubing for glass tube body 100 is continuously drawn from the same type of furnace using either the Danner or the Vello process, which are down draw forming process for forming glass tubing. FIG. 6 depicts one embodiment of a mandrel for glass tube forming using a Danner type drawing process. FIG. 7 depicts one embodiment of a mandrel for glass tube forming using a Vello type drawing process.

In the Danner process, the glass melt 400 flows from the furnace 401 at a controlled rate onto the top of an inclined, hollow refractory mandrel. The glass is in a molten state in the furnace 401 and is received by the mandrel 405 in a molten state. The glass melt 400 from the forehearth of the furnace is allowed to flow in a ribbon from over a downward-inclined (about 20° from the horizontal), as depicted in FIG. 6. In a downdraw process, the glass melt 400 flows through a centrally controlled orifice ring and is pulled vertically downwards by a tractor mechanism. In the Vello process, the glass tube is originally drawn vertically, as depicted in FIG. 7, and is then turned horizontally along support rollers.

The geometry of the glass tube 404 being formed by the Danner process and the Vello process for forming tube in accordance with the structures and methods described herein can result from a combination of a mandrel 405 having a geometry that dictates at least a portion of the glass tube exterior, and a blow pipe 403, 403' that introduces air to provide a hollow interior for the glass tube 404.

In the Vello process, the glass 404 in the furnace 401 flows in to a refractory bowl which has an orifice plate in its base (the "ring"). A vertical mandrel 405 is suspended through the ring. Glass is drawn between ring and the mandrel, initially vertically downwards, but then, as it cools, it is pulled through almost 90 degrees by the drawing machine on to the carbon support rollers.

The mandrel 405 of the Danner and/or Vello process may be composed of a metal, such as molybdenum and/or tungsten. The mandrel 405 includes a hollow interior for housing the glass entering the mandrel 405 from the forehearth of the furnace. The mandrel 405 may include a first opening for receiving the glass 400 from the forehearth of the furnace that has a larger diameter than the orifice through which the glass 404 exits the mandrel 405 in a tube form 404. Referring to FIGS. 10, in the Danner process, the mandrel 405 can be present in a muffle 402 that can control the temperature of the mandrel 405 as the glass flows within the hollow mandrel 405. The temperature of the glass can range from 600° C. to 1200° C. during the tube forming process. The glass forming temperatures may be similar to both the Danner process and Vello process, as depicted in FIGS. 6 and 7.

The mandrel 405 is rotated in the Danner process, and optionally in the Vello process, to manipulate the glass 400 within the mandrel 405, and to traverse the glass 400 along the length of the mandrel 405 from the glass receiving end of the mandrel 405 to the orifice of the mandrel 405 through which the glass passes in tube 404 form. The continuous rotation of the mandrel 405 also causes the glass to flow downstream of the mandrel 405. The glass ultimately flows off the mandrel 405, where it is picked up, gradually cooled by a cooling station 705 and placed between horizontal tractors 710, as depicted in FIG, 8.

In some embodiments, the viscous nature of the molten glass 400, and the rotational of the mandrels 405 causes the molten glass to pass through the mandrel 405, 405. The molten glass 400 is traversed over the molding surfaces of the mandrel 405. In some embodiments, while the glass 400 is being traversed through the mandrel 405, air is blown down the center of the mandrel 405. The air can be introduced to the mandrel 405 through an air tube 403. The introduction of the air creates the hollow interior of the glass tube 404 for the glass tube body 100.

Referring to FIG. 8, the glass tube 404, as it solidifies, is supported between the mandrel 405 and the drawing machine 710 by a series of shaped carbon rollers placed at regular intervals. The size of the tubing drawn depends on the diameter of the mandrel, the draw speed, and the amount of blowing air, the glass temperature and the cooling rate. The cooling rate can be adjusted through a furnace/cooling apparatus 705. The structure identified by reference number 715 represents a take-off machine, which can section the glass tube, i.e, section the glass tube into units that can provide the glass tube body 100 of a lamp 500 including a light emitting diode (LED) light source 200.

It is noted that the above forming methods are provided for illustrative purposes only, and are not intended to limit the present disclosure.

FIG. 9 illustrates one embodiment of sliding a circuit board 203 including at least one light source 200 provided by a plurality of light emitting diodes 201 into a hollow interior of a glass tube body 100. The light source 200 may be engaged to the interior surface S1 of the sidewall of the glass tube body 100 adhesively, or mechanically, e.g., with fasteners. In another embodiment, the light source 200 may be engaged to the interior surface S1 of the sidewall of the glass tube body 100 by fitment to ridges (not shown). The retaining ridges having a geometry for engaging a surface of the light source with an apex directed towards the hollow interior, in which the ridges uniformly extend along a majority of the glass tube body 100 length. In another embodiment, the light source 200 may be engaged to the interior surface S1 of the sidewall of the glass tube body by burlings having a geometry for engaging the light source. The burlings are point impressions in the glass tube body 100 providing an apex extending towards the hollow interior of the glass tube body 100.

FIG. 10 depicts installing end caps 300 having electrical contacts 305 for electrical communication with a lamp fixture. The end caps 300 may be positioned on each end E1, E2 of the glass tube body 100, and have electrical contacts for communication between a lamp fixture and the LED driver 202 of the light source 200, hence providing a lamp 500. In sonic embodiments, wires (not shown) can provide electrical communication between the end caps 300, i.e., the contacts 305 of the end caps 300, to the electrical components of the circuit board 203, such as the electronics driver 202 for the LEDs 201. In some embodiments, the wires are made of metals, and preferably made of copper or steels. Electrical junctions can be provided through mechanical fasteners, such as nut and bolt arrangements, and/or solder like connections.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and. C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or features) as illustrated in the FIGS. It will be understood that the spatially relative terms are intended to encompass different orientations of the device in use or operation in addition to the orientation depicted in the FIGS.

Having described preferred embodiments of methods and structures relating to glass tubes for light emitting diodes (LEDs) light source lamps, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lamp tube comprising:
a glass tube body having a perimeter defined by a sidewall of the glass tube body for enclosing a hollow interior, the glass tube body comprised of a silicate base glass composition including an optically diffusive agent that is alloyed with the silicate base glass composition, wherein the optically diffusive agent is lithium borosilicate, the optically diffusive agent is present in an amount ranging from 15 wt. % to 25 wt. %, wherein a light diffusivity coating is not present on the glass tube body.

2. The lamp tube of claim 1, wherein the silicate base glass composition is a soda lime silicate glass.

3. The lamp tube of claim 2, wherein the glass composition for the soda lime silicate glass comprises 60 wt. % to 75 wt. % silica ($SiO_2$), 12 wt. % to 18 wt. % soda (Na2O), and 5 wt. % to 12 wt. % lime (CaO).

4. The lamp tube of claim 1, wherein the glass tube body has a scatter ratio of 0.5 or more for visible wavelengths between 400 nm and 700 nm.

5. The lamp tube of claim 1, wherein the lithium borosilicate has a chemical formula 42.5 $Li_2O.(57.5-x)B_2O_3-xSiO_2(x=0.5-7.5)$.

6. A lamp comprising:
a glass tube body having a perimeter defined by a sidewall of the glass tube body for enclosing a hollow interior, the glass tube body comprised of a glass composition including an optically diffusive agent, the optically diffusive agent of lithium borosilicate, the optically diffusive agent is present in the glass composition in an amount ranging from 15 wt. % to 25 wt. %; and
at least one light emitting diode (LED) positioned within the hollow interior of the glass tube body.

7. The lamp of claim 6, wherein the glass composition including the optically diffusive agent includes a base glass composition selected from the group consisting of soda glass, soda lime silicate glass, borosilicate glass, alkaline earth aluminosilicate, alkali aluminosilicate glass, an alkali borosilicate glass, a boroaluminosilicate glass and a combination thereof.

8. The lamp of claim 6, wherein the at least one light emitting diode (LED) is on a substrate provided by a circuit board having sidewalls engaged to the sidewall of the glass tube body.

9. The lamp of claim 8, wherein the circuit board further comprises an internal built in ballast and printed circuitry providing electrical communication between the ballast and the light emitting diodes (LED).

10. A method of reducing the incidence of hot spot patterning in light emitting diode containing lamps comprising:
alloying a base glass composition with an optically diffusive agent of lithium borosilicate, the optically diffusive agent is present in the glass composition in an amount ranging from 15 wt. % to 25 wt. %;
drawing a glass melt of the base glass composition with the optically diffusive agent into a tube geometry to provide a glass tube body; and
positioning at least one light emitting diode (LED) within the hollow interior of the glass tube body, wherein the optical diffusive agent alloyed with the base glass composition increases the light diffusivity of the glass tube body in which the at least one light emitting diode is present to substantially eliminate the incidence of hot spot patterning in the glass tube body from said at least one light emitting diode illuminated within the hollow interior of the glass tube body.

11. The method of claim 10, wherein the base glass composition is selected from the group consisting of soda glass, soda lime silicate glass, borosilicate glass, alkaline earth aluminosilicate, alkali aluminosilicate glass, an alkali borosilicate glass, a boroaluminosilicate glass and a combination thereof.

12. The method of claim 10, wherein the base glass composition with the optically diffusive agent comprises 60 wt. % to 75 wt. % silica ($SiO_2$), 12 wt. % to 18 wt. % soda ($Na_2O$), and 5 wt. % to 12 wt. % lime (CaO).

13. The method of claim 10, the base glass composition with the optically diffusive agent comprises 60 wt. % to 75 wt. % silica ($SiO_2$), 12 wt. % to 18 wt. % soda ($Na_2O$), and 5 wt. % to 12 wt. % lime (CaO).

14. The method of claim 10, wherein the base glass composition has a scatter ratio of 0.5 or more for visible wavelengths between 400 nm and 700 nm.

15. The method of claim 10, wherein the at least one light emitting diode (LED) is on a substrate provided by a circuit board having sidewalls engaged to the sidewall of the glass tube body.

16. The method of claim 10, wherein the optically diffusive agent is lithium borosilicate formed by alloying a glass composition of lithium borate ($Li_2O).B_2O_3$ with silica ($SiO_2$).

* * * * *